US008700069B2

(12) United States Patent
MacNaughtan et al.

(10) Patent No.: US 8,700,069 B2
(45) Date of Patent: Apr. 15, 2014

(54) SYSTEMS AND METHODS FOR MOBILE TERMINAL LOCATION DETERMINATION USING RADIO SIGNAL PARAMETER MEASUREMENTS

(75) Inventors: Malcolm MacNaughtan, Cherrybrook (AU); Christopher Ridgway Drane, Pymble (AU); Stephen Brown, West Ryde (AU); Craig Andrew Scott, Mortdale (AU)

(73) Assignee: WaveMarket, Inc., Emeryville, CA (US)

( * ) Notice: Subject to any disclaimer, the term of this patent is extended or adjusted under 35 U.S.C. 154(b) by 1336 days.

(21) Appl. No.: 11/887,949

(22) PCT Filed: Apr. 10, 2006

(86) PCT No.: PCT/AU2006/000479
§ 371 (c)(1),
(2), (4) Date: Oct. 5, 2007

(87) PCT Pub. No.: WO2006/105619
PCT Pub. Date: Oct. 12, 2006

(65) Prior Publication Data
US 2009/0011779 A1    Jan. 8, 2009

(30) Foreign Application Priority Data

Apr. 8, 2005   (AU) ................................ 2005901735
Jul. 6, 2005    (AU) ................................ 2005903577
Nov. 4, 2005   (AU) ................................ 2005906105

(51) Int. Cl.
*H04W 24/00*    (2009.01)
(52) U.S. Cl.
USPC .................. 455/456.6; 455/456.1; 455/456.5; 342/357.25; 340/825.49

(58) Field of Classification Search
USPC .......... 455/456.1, 456.2, 456.3, 456, 5, 456.6
See application file for complete search history.

(56) References Cited

U.S. PATENT DOCUMENTS

| 5,045,861 | A | 9/1991 | Duffett-Smith |
| 5,524,136 | A | 6/1996 | Bar-Noy et al. |
| 5,564,079 | A | 10/1996 | Olsson |
| 5,666,651 | A | 9/1997 | Wang |

(Continued)

FOREIGN PATENT DOCUMENTS

| AU | 200066612 B2 | 10/2000 |
| DE | 29919376 U1 | 2/2000 |

(Continued)

OTHER PUBLICATIONS

International Search Report dated Nov. 3, 2011 for PCT/ AU2011/001038.

(Continued)

*Primary Examiner* — Dwayne Bost
*Assistant Examiner* — Gerald Johnson
(74) *Attorney, Agent, or Firm* — Dovas Law, P.C.

(57) ABSTRACT

A method and system for calculating the location of a mobile radio terminal in a radio communications network. The method provides for the collection of measurements of radio signal parameters at the mobile radio terminal which are then processed and transmitted to a network processor for calculating the location of the mobile radio terminal. The collected measurements may be filtered and subsets of the measurements may also be selected according to their suitability for particular applications.

30 Claims, 7 Drawing Sheets

(56) References Cited

U.S. PATENT DOCUMENTS

| | | | |
|---|---|---|---|
| 5,905,953 A | 5/1999 | Liu et al. | |
| 5,950,125 A | 9/1999 | Buhrmann et al. | |
| 5,969,679 A | 10/1999 | Bolliger | |
| 5,999,126 A * | 12/1999 | Ito | 342/357.25 |
| 6,041,236 A | 3/2000 | Bernardin et al. | |
| 6,052,064 A | 4/2000 | Budnik et al. | |
| 6,061,021 A | 5/2000 | Zibell | |
| 6,073,089 A | 6/2000 | Baker et al. | |
| 6,088,598 A | 7/2000 | Marsolais | |
| 6,097,939 A | 8/2000 | Jacobs | |
| 6,104,344 A | 8/2000 | Wax et al. | |
| 6,167,265 A | 12/2000 | Kim et al. | |
| 6,185,422 B1 | 2/2001 | Mattila | |
| 6,201,499 B1 | 3/2001 | Hawkes et al. | |
| 6,205,326 B1 | 3/2001 | Tell et al. | |
| 6,263,208 B1 | 7/2001 | Chang et al. | |
| 6,266,534 B1 | 7/2001 | Raith et al. | |
| 6,269,246 B1 | 7/2001 | Rao et al. | |
| 6,330,600 B1 | 12/2001 | Matchefts et al. | |
| 6,356,763 B1 * | 3/2002 | Kangas et al. | 455/456.1 |
| 6,360,094 B1 | 3/2002 | Satarsinghe | |
| 6,393,294 B1 | 5/2002 | Perez-Breva et al. | |
| 6,411,819 B1 | 6/2002 | Gutowski | |
| 6,449,257 B1 | 9/2002 | Choi | |
| 6,449,486 B1 | 9/2002 | Rao | |
| 6,496,701 B1 | 12/2002 | Chen et al. | |
| 6,529,165 B1 | 3/2003 | Brice et al. | |
| 6,556,842 B1 | 4/2003 | Ericsson | |
| 6,560,442 B1 | 5/2003 | Yost et al. | |
| 6,567,381 B1 | 5/2003 | Jeon et al. | |
| 6,591,116 B1 | 7/2003 | Laurila et al. | |
| 6,631,262 B1 | 10/2003 | Wee | |
| 6,711,404 B1 | 3/2004 | Arpee et al. | |
| 6,728,539 B2 | 4/2004 | Kuwahara | |
| 6,748,224 B1 | 6/2004 | Chen et al. | |
| 6,782,265 B2 | 8/2004 | Perez-Breva et al. | |
| 6,799,046 B1 | 9/2004 | Tang | |
| 6,834,180 B1 | 12/2004 | Marshall | |
| 6,856,805 B1 | 2/2005 | Raaf | |
| 6,859,654 B1 | 2/2005 | Reynolds et al. | |
| 6,947,734 B1 | 9/2005 | Toubassi | |
| 6,947,835 B2 | 9/2005 | Kaplan et al. | |
| 6,950,664 B2 | 9/2005 | Chen et al. | |
| 6,961,587 B1 | 11/2005 | Vilppula et al. | |
| 7,031,722 B2 | 4/2006 | Naghian | |
| 7,079,850 B2 | 7/2006 | Cameron | |
| 7,096,115 B1 | 8/2006 | Groth et al. | |
| 7,158,790 B1 | 1/2007 | Elliott | |
| 7,158,798 B2 | 1/2007 | Lee et al. | |
| 7,233,800 B2 * | 6/2007 | Laroia et al. | 455/456.1 |
| 7,289,763 B2 | 10/2007 | Dennison et al. | |
| 7,505,433 B2 | 3/2009 | Yaqub et al. | |
| 7,668,832 B2 | 2/2010 | Yeh et al. | |
| 7,697,920 B1 | 4/2010 | McClain | |
| 7,751,827 B2 * | 7/2010 | Poykko et al. | 455/456.1 |
| 7,835,301 B1 | 11/2010 | Maufer | |
| 2001/0022558 A1 | 9/2001 | Karr et al. | |
| 2002/0042268 A1 | 4/2002 | Cotanis | |
| 2002/0042269 A1 | 4/2002 | Cotanis | |
| 2002/0101834 A1 | 8/2002 | Stanley | |
| 2002/0111772 A1 | 8/2002 | Skidmore et al. | |
| 2002/0128019 A1 * | 9/2002 | Ben-Yair et al. | 455/456 |
| 2002/0164997 A1 | 11/2002 | Parry | |
| 2002/0168989 A1 | 11/2002 | Dooley et al. | |
| 2002/0173275 A1 | 11/2002 | Coutant | |
| 2002/0193150 A1 | 12/2002 | Pritchard | |
| 2003/0008668 A1 | 1/2003 | Perez-Breva et al. | |
| 2003/0032404 A1 | 2/2003 | Wager et al. | |
| 2003/0040318 A1 | 2/2003 | Fattouche | |
| 2003/0043941 A1 | 3/2003 | Johnson et al. | |
| 2003/0060214 A1 | 3/2003 | Hendrey et al. | |
| 2003/0078042 A1 | 4/2003 | Miriyala et al. | |
| 2003/0078055 A1 | 4/2003 | Smith et al. | |
| 2003/0109274 A1 | 6/2003 | Budka et al. | |
| 2003/0119501 A1 | 6/2003 | Kim | |
| 2003/0125031 A1 | 7/2003 | Sung Lim et al. | |
| 2003/0147362 A1 | 8/2003 | Dick et al. | |
| 2003/0148771 A1 | 8/2003 | de Verteuil | |
| 2003/0186710 A1 | 10/2003 | Muhonen et al. | |
| 2003/0190916 A1 | 10/2003 | Celedon et al. | |
| 2003/0208589 A1 | 11/2003 | Yamamoto | |
| 2004/0018835 A1 | 1/2004 | Myers et al. | |
| 2004/0037258 A1 | 2/2004 | Scherzer et al. | |
| 2004/0116111 A1 | 6/2004 | Saunders | |
| 2004/0132464 A1 | 7/2004 | Poykko et al. | |
| 2004/0152470 A1 | 8/2004 | Spain | |
| 2004/0157621 A1 | 8/2004 | Yamasaki et al. | |
| 2004/0160365 A1 | 8/2004 | Riley et al. | |
| 2004/0185822 A1 | 9/2004 | Tealdi et al. | |
| 2004/0199398 A1 | 10/2004 | Kubota | |
| 2004/0203717 A1 | 10/2004 | Wingrowicz | |
| 2004/0203880 A1 | 10/2004 | Riley | |
| 2004/0203885 A1 | 10/2004 | Quaid | |
| 2004/0225681 A1 | 11/2004 | Chaney et al. | |
| 2004/0248589 A1 | 12/2004 | Gwon et al. | |
| 2004/0259555 A1 | 12/2004 | Rappaport et al. | |
| 2005/0012613 A1 | 1/2005 | Eckstein et al. | |
| 2005/0040968 A1 | 2/2005 | Damarla et al. | |
| 2005/0044564 A1 | 2/2005 | Stopniewicz et al. | |
| 2005/0066325 A1 | 3/2005 | Mori et al. | |
| 2005/0113117 A1 | 5/2005 | Bolin et al. | |
| 2005/0134696 A1 | 6/2005 | Nath et al. | |
| 2005/0136938 A1 | 6/2005 | Kang | |
| 2005/0169183 A1 | 8/2005 | Lakkakorpi | |
| 2005/0192031 A1 | 9/2005 | Vare | |
| 2005/0202821 A1 | 9/2005 | Pischella | |
| 2005/0210342 A1 | 9/2005 | Schwagmann | |
| 2005/0227683 A1 | 10/2005 | Draluk et al. | |
| 2005/0239478 A1 | 10/2005 | Spirito | |
| 2005/0282540 A1 | 12/2005 | Motamedi et al. | |
| 2005/0282544 A1 | 12/2005 | Oommen et al. | |
| 2005/0283540 A1 | 12/2005 | Fux et al. | |
| 2006/0019665 A1 | 1/2006 | Aghvami et al. | |
| 2006/0019679 A1 | 1/2006 | Rappaport et al. | |
| 2006/0025068 A1 | 2/2006 | Regan et al. | |
| 2006/0025158 A1 | 2/2006 | Leblanc et al. | |
| 2006/0052057 A1 | 3/2006 | Persson et al. | |
| 2006/0064346 A1 | 3/2006 | Steenstra et al. | |
| 2006/0087425 A1 | 4/2006 | Haeberlen et al. | |
| 2006/0205417 A1 | 9/2006 | Ju et al. | |
| 2006/0221901 A1 | 10/2006 | Yaqub et al. | |
| 2006/0227045 A1 | 10/2006 | Sheynblat | |
| 2006/0229090 A1 | 10/2006 | LaDue | |
| 2006/0234701 A1 | 10/2006 | Wang et al. | |
| 2006/0270421 A1 | 11/2006 | Phillips et al. | |
| 2007/0001808 A1 | 1/2007 | Kastelic et al. | |
| 2007/0001867 A1 * | 1/2007 | Rowe et al. | 340/825.49 |
| 2007/0087764 A1 | 4/2007 | Buckley et al. | |
| 2007/0121520 A1 | 5/2007 | Shrikhande et al. | |
| 2007/0123268 A1 | 5/2007 | Parata | |
| 2007/0208495 A1 | 9/2007 | Chapman et al. | |
| 2007/0232319 A1 | 10/2007 | Bells et al. | |
| 2007/0259670 A1 | 11/2007 | Sakhpara | |
| 2007/0270168 A1 | 11/2007 | Sheynblat | |
| 2007/0297346 A1 | 12/2007 | Huismann et al. | |
| 2008/0004037 A1 | 1/2008 | Achlioptas et al. | |
| 2008/0030345 A1 | 2/2008 | Austin et al. | |
| 2008/0061967 A1 | 3/2008 | Corrado | |
| 2008/0144082 A1 | 6/2008 | Kister | |
| 2008/0194235 A1 | 8/2008 | Dalsgaard | |
| 2009/0160939 A1 | 6/2009 | Fernandez et al. | |
| 2009/0182630 A1 | 7/2009 | Otto et al. | |
| 2009/0294538 A1 | 12/2009 | Wihlborg et al. | |
| 2010/0167725 A1 | 7/2010 | Noldus et al. | |
| 2011/0244919 A1 | 10/2011 | Aller et al. | |
| 2012/0253668 A1 | 10/2012 | Sheha et al. | |

FOREIGN PATENT DOCUMENTS

| | | |
|---|---|---|
| EP | 0431956 A2 | 7/1990 |
| EP | 0874248 A2 | 10/1998 |
| EP | 0936758 A2 | 8/1999 |
| EP | 0982964 A2 | 3/2000 |
| EP | 1030531 A1 | 8/2000 |

(56) References Cited

FOREIGN PATENT DOCUMENTS

| | | |
|---|---|---|
| EP | 1120632 B1 | 8/2001 |
| EP | 1175115 A2 | 1/2002 |
| EP | 1235076 A1 | 8/2002 |
| EP | 1271101 A2 | 1/2003 |
| EP | 1304897 A1 | 4/2003 |
| EP | 0767594 B1 | 11/2003 |
| EP | 1677562 A1 | 7/2006 |
| EP | 1137305 B1 | 1/2008 |
| EP | 2083576 A1 | 7/2009 |
| EP | 1872150 B9 | 10/2012 |
| GB | 2352134 A | 1/2001 |
| GB | 2358500 A | 7/2001 |
| GB | 2364617 A | 1/2002 |
| JP | 07-255079 A | 10/1995 |
| JP | 08-265824 A | 10/1996 |
| JP | 2001-330657 A | 11/2001 |
| JP | 2004-104349 A | 4/2004 |
| WO | WO 92/02105 A1 | 2/1992 |
| WO | WO 93/15569 | 8/1993 |
| WO | WO 95/35636 A1 | 12/1995 |
| WO | WO 97/11384 A | 3/1997 |
| WO | WO 98/12885 A2 | 3/1998 |
| WO | WO 98/48578 A2 | 10/1998 |
| WO | WO 9843450 | 10/1998 |
| WO | WO 99/13662 A | 3/1999 |
| WO | WO 00/18148 A | 3/2000 |
| WO | WO 00/28755 A1 | 5/2000 |
| WO | WO 0049826 | 8/2000 |
| WO | WO 01/03372 A | 1/2001 |
| WO | WO 01/37601 | 5/2001 |
| WO | WO 01/99082 A2 | 12/2001 |
| WO | WO 02/47421 | 12/2001 |
| WO | WO 0195592 | 12/2001 |
| WO | WO 02/073997 A1 | 9/2002 |
| WO | WO 02/082850 | 10/2002 |
| WO | WO 03/087869 | 10/2003 |
| WO | WO 2004034721 | 4/2004 |
| WO | WO 2004/047315 A2 | 6/2004 |
| WO | WO 2004/079478 A2 | 9/2004 |
| WO | WO 2004/080105 A2 | 9/2004 |
| WO | WO 2004/084022 A2 | 9/2004 |
| WO | WO 2005/009020 A1 | 1/2005 |
| WO | WO 2005/109695 A1 | 11/2005 |
| WO | WO 2006/026816 A2 | 3/2006 |
| WO | WO 2006/053835 A1 | 5/2006 |
| WO | WO 2006/059188 A1 | 6/2006 |
| WO | WO 2006087438 A1 | 8/2006 |
| WO | WO 2006/096922 A1 | 9/2006 |
| WO | WO 2006/096923 A1 | 9/2006 |
| WO | WO 2006/105618 A1 | 10/2006 |
| WO | WO 2006/105615 A1 | 10/2006 |
| WO | WO 2006/112561 | 10/2006 |
| WO | WO 2006/125085 | 11/2006 |
| WO | WO 2007/017691 A1 | 2/2007 |
| WO | WO 2007/020635 A2 | 2/2007 |
| WO | WO 2007/040320 A1 | 4/2007 |
| WO | WO 2007040320 | 4/2007 |
| WO | WO 2007/048176 | 5/2007 |
| WO | WO 2007/048177 | 5/2007 |
| WO | WO 2007/051223 A1 | 5/2007 |
| WO | WO 2007/071271 A1 | 6/2007 |
| WO | WO 2007/102816 A1 | 9/2007 |
| WO | WO 2007/115777 A1 | 10/2007 |
| WO | WO 2008/055302 | 5/2008 |
| WO | WO 2008/059570 | 5/2008 |
| WO | WO 2008/109948 A1 | 9/2008 |
| WO | WO 2009/036497 | 3/2009 |
| WO | WO 2009/067766 | 6/2009 |
| WO | WO 2009080105 | 7/2009 |
| WO | WO 2009/124348 | 10/2009 |
| WO | WO 2009/124349 | 10/2009 |
| WO | WO 2010/022470 | 3/2010 |
| WO | WO 2010090558 | 8/2010 |

OTHER PUBLICATIONS

Mir et. al, "A Zone-Based Location Service for Mobile Ad Hoc Networks", 1NCC 2004, Jun. 2004.
3GPP TR05.08, "Radio Subsystem Link Control", Nov. 2005.
3GPP SA WG2, "Voice Call Continuity between CS and IMS Study" 3GPP TR 23.806 V7 0.0, Dec. 1, 2005, pp. 1-153, XP002385067.
Specification 3GPP TS 23.048, "Technical Specification Group Core Network and Terminals; Security Mechanisms for the (U)SIM Application Toolkit", 2005-2006.
Specification 3GPP TS 25.304 "User Equipment (UE) Procedures in Idle Mode and Procedures for Cell Reselection in Connected Mode", 2011.
Specification 3GPP TS 03.22, "Radio Access Network; Functions Related to Mobile Station(MS) in Idle Mode and Group Receive Mode", 1999.
International Search Report of PCT/AU2006/001577 dated Nov. 28, 2006.
M. Hata, "Empirical formula for propagation loss in land mobile radio services" IEEE Transactions on Vehicular Technology, vol. VT-29, pp. 317-325, Aug. 1980.
T. Roos, P. Myllymaki, and H. Tirri, "A statistical modeling approach to location estimation," IEEE Transactions on Mobile Computing vol. 1, pp. 59-69, Jan. 2002.
T. Halonen J. Romero and J. Melero, GSM, GPRS and EDGE Performance; Evolution Towards SG/UMTS. John Wiley and Sons, 2nd ed., 2003.
L.M. Correia, Wireless Flexible Personalized Communications: COST 259 European Co-Operation in Mobile Radio Research. Wiley 2001.
IEEE Vehicular Technology Society Committee on Radio Propagation Coverage Prediction for Mobile Radio Systems Operating in the 800/900 MHz frequency range IEEE Transactions on Vehicular Technology: Special Issue on Mobile Radio Propagation, vol. 37, pp. 3-72, Feb. 1988.
3rd Generation Partnership Program, "3GPP TR 25.942 Radio Frequency (RF) System Scenarios," tech. rep., 3GPP, 2004.
Schwartz et al., "On the Distribution and Moments of Power Sums with Logonormal Components", Bell Sys. Tech, J., vol. 61, No. 7, pp. 1441-1463.
Balis P. G. et al. "UTD-Based Model for Prediction of Propagation Path Loss and Shadowing Variability in Urban Mobile Environments" IEE Proceedings: Microwaves, Antennas and Propagation, IEE, Stevenage, Herts, GB, vol. 144 No. 5 Oct. 9, 1997, pp. 367-371 XP006008788 ISSN: 1350-2417.
W.C.Y. Lee, Mobile Communications Engineering. McGraw-Hill, 1982.
Bernardin et al., "Cell Radius Inaccuracy: A New Measure of Coverage Reliability", IEEE Transactions on Vehicular Technology, vol. 47, No. 4, Nov. 1998.
W.H. Press S. A. Teukolsky, W.T. Vetterling & B.P. Flannery, "Numerical Recipes in C++; The Art of Scientific Computing", 2nd Ed, Feb. 2002, Cambridge University Press.
C.R. Drane, Positioning Systems-A Unified Approach, Lecture Notes in Control and Infromation Sciences, Springer Verlag, Oct. 1992.
P.L.H.A.S. Fischer, "Evaluation of Positioning Measurement Systems," T1P1.5/97-110, Dec. 1997.
A.M. Zoubir and B. Boobash, "The Bootstrap and Its Application in Signal Processing," IEEE Signal Processing Magazine, 15(1):56-76, Jan. 1998.
Martin Hellenbrandt, Rudolf Mathar and Scheibenbogen Markus, "Estimating Position and Velocity of Mobiles in a Cellular Radio Network," IEEE Transactions on Vehicular Technology, 46(1): 65-71, Feb. 1997.
Section 2.7 of Mobile Radio Communications 2nd Ed. Steele and Hanzo, IBSN 047197806X,J. Wiley & Sons Ltd., 1999.
B. Matsumori T1P1.5/98-600 "Radio Camera System and Location Fingerprinting Technology", Presentation Submission to Location Standards Working Group T1P1.5 by U.S. Wireless 1998.

(56) References Cited

OTHER PUBLICATIONS

Annex I of GSM 05.05 "Digital cellular Telecommunication System (Phase 2)", Radio Transmission and Reception, 2001.
S.R. Saunders & A. Aragon-Zavala, Antennas and Propagation for Wireless Communications Systems: 2nd Ed., Wiley 2007.
Doru-Petru Munteanu, Onoriu Bradeanu, Petrica Ciotirnae, Constantin-Julian Vizitiu: "Zone Profile Generation for Location Based Services and Traffic Analysis", 12th WSEAS International Conference on Communications, Heraklion, Greece, Jul. 23-25, 2008, pp. 386-390.
Specification 3GPP TS 31.111—Sections 6.4, 6.616, 6.6.21 and 6.6.22.
"Computational Geometry in C (Cambridge Tracts in Theoretical Computer Science)", Joseph O'Rourke, Cambridge University Press; 2000 edition, ISBN 0521649765.
European Search Report dated Nov. 4, 2010 for EP 08714391.3.
International Search Report dated Sep. 20, 2004 for PCT/AU2004/000983.
European Search Report dated Mar. 15, 2007 for EP 04737602.5.
International Search Report dated Dec. 5, 2005 for PCT/AU2005/001358.
International Search Report dated May 7, 2008 for PCT/AU2008/000344.
International Search Report dated Apr. 26, 2006 for PCT/AU2006/000347.
International Search Report dated Apr. 26, 2006 for PCT/AU2006/000348.
European Search Report dated Feb. 19, 2010 for EP 06721361.1.
International Search Report dated May 31, 2006 for PCT/AU2006/000479.
International Search Report dated Jun. 29, 2006 for PCT/AU2006/000478.
European Search Report dated Dec. 22, 2009 for EP 06721360.3.
European Search Report dated Jul. 23, 2010 for EP 06705018.7.
International Search Report dated Jan. 24, 2007 for PCT/AU2006/001479.
International Search Report dated Dec. 19, 2006 for PCT/AU2006/001576.
International Search Report dated Feb. 19, 2008 for PCT/AU2007/001706.
International Search Report dated Nov. 24, 2008 for PCT/AU2008/001374.
International Search Report dated Jan. 15, 2009 for PCT/AU2008/001783.
International Search Report dated Jun. 1, 2009 for PCT/AU2009/000436.
International Search Report dated Nov. 25, 2009 for PCT/AU2009/001123.
International Search Report dated May 11, 2009 for PCT/AU2009/000438.
European Search Report dated Feb. 19 2009 for EP 06705017.9.
OMA Download Architecture—Version 1.0, Jun. 25, 2004.
European Search report dated Jul. 25, 2012 for European Patent Application 06790349.2.
European Search Report dated Mar. 2, 2012 for European Patent Application 09729670.1.
European Search Report dated Feb. 24, 2012 for European Patent Application 09729862.4.
European Search Report dated Feb. 22, 2012 for European Patent Application 08714391.3.
European Search Report dated Mar. 12, 2012 for European Patent Application 06790414.4.
European Search Report dated Mar. 9, 2012 for European Patent Application 08800009.6.
European Search Report dated Mar. 12, 2012 for European Patent Application 06804431.2.
71(3) EPC Communication Re Intention to Grant EU Application No. 06721361.1 dated Jun. 13, 2012.

* cited by examiner

Position estimate calculated using parameters for an urban environment

Position estimate calculated using parameters for a rural environment

SYSTEMS AND METHODS FOR MOBILE TERMINAL LOCATION DETERMINATION USING RADIO SIGNAL PARAMETER MEASUREMENTS

CROSS REFERENCE TO RELATED APPLICATION

This application is the National Phase application of International Application No. PCT/AU2006/000479, filed 10 Apr. 2006, which designates the United States and was published in English, which claims priority to Australian Application No. 2005901735, filed 8 Apr. 2005; Australian Application No. 2005903577, filed 6 Jul. 2005; and Australian Application No. 2005906105, filed 4 Nov. 2005. Each of these applications, in its entirety, is incorporated herein by reference.

TECHNICAL FIELD

This invention relates to methods and apparatus for locating a mobile radio terminal within a radio communications network.

PRIORITY DOCUMENTS

The present application claims priority from:

Australian Provisional Patent Application No. 2005901735 entitled "Mobile Location" and filed on 8 Apr. 2005; Australian Provisional Patent Application No. 2005903577 entitled "Enhanced Terrestrial Mobile Location" and filed on 6 Jul. 2005; and Australian Provisional Patent Application No. 2005906105 entitled "Profile Based Communications Service" and filed on 4 Nov. 2005. The entire content of each of these applications is hereby incorporated by reference.

INCORPORATION BY REFERENCE

The following co-pending patent applications are referred to in the following description:
 PCT/AU2005/001358 entitled "Radio Mobile Unit Location System";
 PCT/AU2006/000347 entitled "Enhanced Mobile Location Method and System";
 PCT/AU2006/000348 entitled "Enhanced Mobile Location"
 Co-pending International Patent Application entitled "Enhanced Terrestrial Mobile Location" and claiming priority from Australian Provisional Patent Application Nos. 2005901735, 2005903577 and 2005906105.

The entire content of each of these applications is hereby incorporated by reference.

BACKGROUND

There are a range of existing systems for locating mobile phones. These can be grouped into three categories as follows:

Network based systems. Such systems perform the signal parameter measurements as well as the location calculation in one or more network based servers.

Handset based systems. In these systems, both the measurements and the location calculations are performed in the handset.

Hybrid. In these systems the measurements are performed in one place while the position calculation is performed in another. For instance the handset may make the measurements and report them to a network based entity where the location calculations are performed. In some cases the measurements are pre-processed before sending.

Limitations of Current Systems

When operating a particular location based service, a key determining factor in the success of the service is the cost to the user. In the case of location based services, a large proportion of this cost is due to actually obtaining the location estimate. In many cases, this cost is incurred primarily in obtaining the signal parameter measurements for the location calculation. As an example, in a handset assisted hybrid system, the network based entity has to open a connection to the mobile and request the measurements. The handset in turn must transmit the measurements to the requesting entity. This exchange consumes network resources and as a result incurs a cost. Further the network resources are finite and thus limiting the number of users that can be tracked simultaneously as well as necessitating a compromise with respect to other services that require the network resources. In the following paragraphs we will outline the limitations of current systems compared to the system of this invention. The primary limitations are either excessive cost or inadequate performance.

Network Based Systems

In network based systems, network based equipment measures parameters of signals received from the mobile. The measuring equipment may be existing mobile network base stations or ancillary receivers installed as an overlay to an existing network. In either case there is a fundamental requirement for the mobile to be transmitting in order for signals to be available for measurement. This represents a serious limitation for any location based service where frequent monitoring of a mobile's location is needed but the use of the location for commercial benefit is much less frequent. To illustrate, consider a mobile advertising application. A particular store or chain wishes to know when a registered customer approaches a store. The aim is to transmit a targeted advertisement perhaps accompanied by a time limited discount offer to entice the recipient into the store. To operate such an application with a network based location system, periodic location measurements would have to be performed, say at 10 minute intervals. Each of these location measurements requires the mobile to be activated, incurring a cost in terms of network resources and battery usage in the mobile. As an indicative cost, at the current time, mobile operators appear to be charging a similar rate per request to that charged for Short Message Service (SMS). In the example at hand, the location requests might continue for an extended period of days or even weeks without the customer being located near the store. The result is a very large accumulated cost for the locations without the store owner having the opportunity to send a single advertisement. Store owners and other similar potential users of such a system will not use services under such terms.

Hybrid Location Systems

In the most common hybrid architectures, measurements are made by the handset and then provided to a network based entity for position calculation. The limitation in this case is the same as for network based systems. Each position evaluation requires the transfer of measurements from the handset to the network based entity. This transfer could be via SMS, General Packet Radio Service (GPRS) or other wireless bearer however all incur a finite cost which accumulates with each cycle and in no fixed proportion to the commercial benefit being derived.

Handset Based Solutions

The limitations described in the previous paragraphs can be overcome using a system in which the location of the user can be monitored without a transaction cost. In the application example above, a cost should only accrue when the customer is in the vicinity of the store. Handset based systems can provide such a solution.

There are existing handset based solutions. Perhaps the most well known is the satellite based solution in which a Global Positioning System (GPS) receiver is integrated with the handset. This type of system can provide accurate, cost free monitoring of position and a transaction only when useful. One disadvantage of this solution is the relative low penetration of GPS enabled handsets in the marketplace This means that location based services using such handsets can be offered to only a small percentage of mobile subscribers. Further, reliable operation of GPS receivers is generally limited to outdoor environments with a reasonable view of the sky.

Another existing handset based solution provides a coarse Cell Identity (CID) based position calculation. This uses the location of the base station currently serving the mobile. The mobile knows the identity of the serving base station. If the mobile has available a table of base station identifiers and corresponding locations then an approximate location can be calculated. While this approach avoids the repeated location transaction cost, it suffers from a major disadvantage due to the inaccuracy of the locations. In some cases the errors can be several kilometers. Whilst techniques are known for obtaining improved accuracy using more sophisticated algorithms, these are unsuitable for implementation either on a handset or more particularly on a Subscriber Identity Module (SIM) card due to the very limited processing and memory resources.

SUMMARY OF THE INVENTION

According to one aspect of the present invention, there is provided a method of obtaining location data for use in a location calculation, the method comprising:
  obtaining at least one measurement of a plurality of radio signal parameters at a first time;
  obtaining at least one subsequent measurement of a plurality of subsequent radio signal parameters at a second time;
  applying the at least one measurement and the at least one subsequent measurement to a filter to obtain the location data.

In one form, the at least one measurement and the at least one subsequent measurement are obtained by a mobile radio communications terminal.

In one aspect, the location data is stored for subsequent transmission to a processor for use in the location calculator.

In another form, the location data is transmitted to the processor intermittently.

In a further form, the location data is transmitted to the processor at regular time intervals.

In another form, the location data is transmitted to the processor upon request.

In another form, the location data is transmitted to the processor upon request of the processor.

In one form, the location data is transmitted to the processor upon request of the processor.

In another form, the location data is transmitted to the processor upon request of a user of the mobile radio terminal.

In another aspect, the location data is transmitted upon a change in location of the mobile radio terminal.

In a further aspect, further measurements of a further plurality of radio signal parameters are obtained, until a buffer of the mobile radio terminal is full.

In another form, the method further comprises selecting a subset of the obtained at least one measurement and at least one subsequent measurement for filtering according to a specific application.

In another form, the method further comprises storing a plurality of location data.

In another form, the method further comprises selecting a subset of the location data according to a specific application.

In a further form, the location data is transmitted in a variable length data message.

In another aspect, the length of the data message is determined according to a specific application.

In another form, the method further comprises periodically removing one or more of the at least one measurement and or the at least one subsequent measurement.

In another form, the step of periodically removing the one or more of the at least one measurement and the one or more of the at least one subsequent measurement is done according to their relevance.

In another aspect, the method further comprises selecting a subset of obtained location data for transmission, according to the relevance of the subset.

In another aspect, the method further comprises selecting a subset of obtained location data for transmission, according to the size of the transmission data message.

In a further aspect, the plurality of radio signal parameters include at least one unambiguous radio signal parameter and at least one ambiguous radio signal parameter.

In one form, the ambiguous radio signal parameter is resolved before being applied to the filter.

In a further form, the step of resolving the ambiguous radio signal parameter is deferred for as long as possible prior to being applied to the filter.

In another aspect, the method further comprises sending assistance information to the mobile radio terminal.

In a further form, a location estimation is calculated at the mobile radio terminal using the assistance information.

According to another aspect of the present invention, there is provided a method for calculating the location of a mobile radio terminal in a radio communications network the method comprising:
  receiving location data processes according to the method of any one of the previous aspect, relating to the location of the mobile radio terminal; and processing the data to calculate the location of the mobile radio terminal.

In one form, the step of processing comprises minimising a cost function.

In a further form, the cost function is given by:

$$C(x) = C_r(x) + C_t(x) + C_u(x)$$

where:
  $C_r$ is the cost associated with signal strength observations;
  $C_t$ is the cost associated with timing advance observations; and
  $C_u$ is the cost associated with unreported cell observations.

In a further form, $C_r$, $C_t$ and $C_u$ are calculated as follows:

$$C_r(x) = \sum_{i=1}^{N_r} \frac{(r_i - p_r(k_{r_i}, x))^2}{2\sigma_r^2};$$

$$C_t(x) = \sum_{i=1}^{N_r} \frac{(t_i - p_t(k_{t_i}, x))^2}{2\sigma_t^2}; \text{ and}$$

-continued $$C_u(x) = -\sum_{i=1}^{N_u} \log\left[\frac{1}{2}\left(1 + \text{erf}\left(\frac{r_u - p_u(k_{u_i}, x)}{\sqrt{2}\,\sigma_r}\right)\right)\right]$$

According to another aspect of the present invention, there is provided a system for performing the steps of any one of the previous aspects of the present invention.

According to a further aspect of the present invention, there is provided a mobile radio terminal for performing the steps of the first aspect of the present invention.

DETAILED DESCRIPTION

The present invention will now be described in detail with reference to one or more embodiments of the invention, examples of which are illustrated in the accompanying drawings. The examples and embodiments are provided by way of explanation only and are not to be taken as limiting to the scope of the invention. Furthermore, features illustrated or described as part of one embodiment may be used with one or more other embodiments to provide a further new combination.

It will be understood that the present invention will cover these variations and embodiments as well as variations and modifications that would be understood by the person skilled in the art.

Throughout this specification, the term "mobile" or "mobile phone" is used synonymously with terms such as "cell phones" or "mobile radio terminal", and will be understood to encompass any kind of mobile radio terminal such as a cell phone, Personal Digital Assistant (PDA), lap top or other mobile computer, or pager.

In the following description, when processing is described as being carried out in a mobile terminal, it will be understood that the processing could be carried out in the handset, in the Subscriber Identification Module (SIM) that is inserted in the handset, in an additional processing or smart card inserted into the handset, or in a combination of two or more of these.

It will also be understood that much of the processing that occurs in the implementation of various aspects of the present invention can also be distributed between the handset, one or more network elements within the radio communications network and/or one or more elements outside the radio communications network. It will also be understood that the invention may be applied to any application in which a location estimate for a mobile terminal is required.

Architecture

Figure 1:
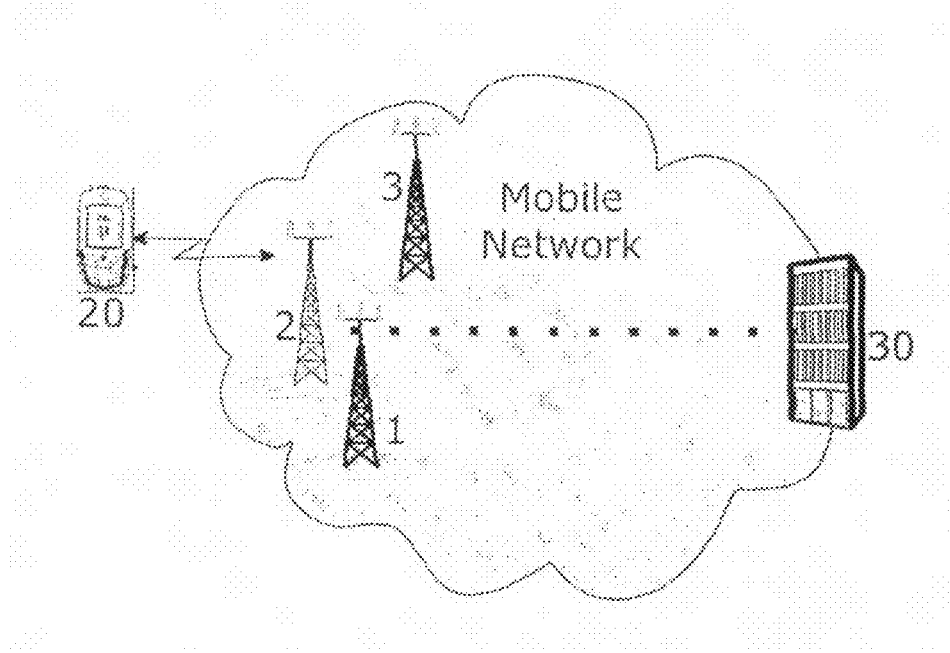
FIG. 1—illustrates the architecture of the proposed system.

FIG. 1 shows a part of an exemplary radio communications network 10 having transmitters or base transceiver stations 1, 2, and 3. Also shown in FIG. 1 is a mobile radio terminal or mobile 20 and a server 30. The server may either be integrated into the network or associated with the network.

In one embodiment of the present invention, radio parameter measurements relating to the location of the mobile terminal are made at the terminal. These may include cell identifiers, channel frequencies, other identification codes such as base station identity codes or scrambling codes, and timings including round trip timings or time differences. In one form of this embodiment, the measurements are made repeatedly at a configurable rate. The measurements are added to an accumulator as described below. When the measurements are required at a network based server for a location calculation, some or all of the information in the measurement accumulator are encoded in a message and transmitted to the server. Optionally the information is compressed, with or without loss. This transmission may be initiated by a request message form the server. Alternatively the transmission may be initiated on a periodic basis. Alternatively the transmission may be triggered by the mobile upon detecting a sufficient change in position. The types of measurements available may vary depending on the application, the measurement capabilities of the mobile terminal as well as the type of radio network and the bearer used to carry the data. For instance in a GSM network, where a SIM card is used to host the mobile terminal component of the system, the measurements may include serving cell identifiers, ARFCNs, BSICs and received signal levels. In another example, where the network is a UMTS network, the measurements may include one or more serving cell identifiers, one or more pilot channel (CPICH) signal level (RSCP) measurements, one or more round trip delay (RTT) measurements and one or more time difference measurements (SFN-SFN offsets). In yet another example, where the network is a CDMA network, the measurements might include one or more base station IDs, one or more pilot channel (PICH) received levels, one or more PN offsets and one or more round trip delays.

At times when the terminal has an established connection with the network timing advance measurements are available and may also be used. Indeed in some implementations, including SIM Toolkit in GSM, it may be possible to detect the establishment of a connection and opportunistically collect one or more timing measurements at such times. In other cases when the software is implemented directly in the terminal, the measurements may include all of the above mentioned measurement types plus time differences.

The radio parameter measurements are processed at the server to obtain a location estimate as described below. Compared to existing systems in which a location measurement is obtained simply by processing the most recent measurement set available at the mobile terminal or in the network, the present system achieves significantly better accuracy through the use of an accumulator that maximises the diversity of the information to be used for the calculation. This enables short term fluctuations in measurements to be reduced and makes additional information available for the location calculation.

Some measurements are only available when the mobile has an established connection with the network. An example of such a measurement is Timing Advance in GSM. Additional measurements of this type can provide improve the accuracy of the location calculation. Some applications might have higher quality of service (or accuracy) requirements. To satisfy such application requirements, the mobile may initiate a connection with the network, gather one or more timing measurements and then close the connection. Note that this additional step would only be performed in situations where a recent timing measurement is not available and the QOS requirements necessitate such a measurement. The connection may be a voice, data, GPRS or other type of connection that enables a timing advance measurement to be obtained. The one or more timing measurements are then incorporated with the other measurements used for location calculation.

General Description of the Benefits of Measurement Accumulation

The present invention provides a measurement accumulator at the mobile terminal to accumulate radio parameter measurements in a manner that maximises the information available for location calculation as well as mitigating some of the risks that arise in handling ambiguous measurements. Typically the accumulation is performed over multiple measurement sets where each set contains a limited number of measurements. The ambiguous measurements refer to the lack of a unique identifier for some of the measurements. Multiple measurements having the same non-unique identifier do not necessarily derive from the same base station.

As an example, the Network Measurement Report from a GSM terminal contains at most information pertaining to one serving cell and six neighbour cells. Repeated measurements however over a short period may exhibit some diversity due to the variations in radio propagation such as fading and non-stationary interference. This means that compared to calculating a location estimate using any single measurement set, it is frequently possible to obtain a more accurate estimate by instead accumulating the results of several successive measurement sets and combining these in some fashion to perform a location calculation. It should be noted that this improvement is likely to be more pronounced than the gain achieved simply reporting an average of multiple noisy observations of the same parameter as will be understood by one skilled in the art. The Network Measurement Report also illustrates the existence of ambiguous measurements. The neighbour cells are commonly identified only by their frequency and base station identity code or just the frequency. Unlike the cell identity, these are not guaranteed to be unique across the network. Determining an accurate location estimate requires that the ambiguous measurements be associated with the correct base station and that measurements from different base stations are not inadvertently mixed together such as by averaging.

In the following paragraphs we show examples taken from a mobile terminal operating in a GSM network to illustrate the additional information that may be gained by accumulating multiple measurement cycles.

Table 1 shows the results of two measurement cycles taken on a standard GSM handset in idle mode, separated by 5 seconds.

TABLE 1

| First cycle: | |
|---|---|
| cid: | 25867 |
| arfcn: | [99 14 95 87 2 89 73] |
| rxLev: | [−37 −34 −42 −58 −72 −73 −78] |
| bsic: | [20 33 34 44 1 54 15] |
| Second cycle: | |
| cid: | 25867 |
| arfcn: | [99 14 95 87 89 2 91] |
| rxLev: | [−39 −35 −42 −52 −68 −71 −73] |
| bsic: | [20 33 34 44 54 1 57] |

In the first measurement set, a cell having ARFCN 73 and BSIC 15 is reported as the weakest neighbour cell. In the subsequent measurement set however, this has been replaced with a cell having ARFCN 91 and BSIC 57. By obtaining the second measurement and combining the two sets in the accumulator in the manner shown below, we obtain not just the benefit of averaged power levels for these cells, but also a measurement pertaining to an additional cell. The availability of an additional cell for location calculation frequently enables a more accurate location than for instance simply a second measurement of an existing cell. This is because of the increased diversity of reference points (cell sites) in the data and the corresponding improvement in the geometric dilution as is well known to those in the art. This geometric dilution effect is commonly referred to by terms such as Horizontal Dilution Of Precision (HDOP) or Geometric Dilution Of Precision (GDOP). Diversity of measurements also facilitates the rejection of distinctly erroneous measurements which would otherwise cause large errors in the location estimate. Techniques for achieving such rejection are well known in the art.

Yet another benefit can be gained from the temporal variations in the reported measurements. Table 2 shows another pair of successive measurements, again separated by 5 seconds in time, measured on a GSM mobile terminal, this time in dedicated mode, that is, the mobile has a connection established with the network.

TABLE 2

| Cycle 1: | |
|---|---|
| cid: | 9702 |
| arfcn: | [26 18 12 12 38 14 20] |
| ta: | 8 |
| rxLev: | [−74 −70 −75 −70 −74 −76 −76] |
| bsic: | [35 4 17 17 −99 −99 −99] |
| Cycle 2: | |
| cid: | 9702 |
| arfcn: | [26 18 6 12 6 20 8] |
| ta: | 8 |
| rxLev: | [−71 −63 −77 −70 −74 −76 −74] |
| bsic: | [35 4 33 17 33 −99 −99] |

In this case, observe in the first measurement that there are 3 BSIC values reported as −99. This is a reserved value used when the mobile terminal has in fact been unable to decode the BSIC for this cell, due for instance to interference.

In the second measurement set however, the first of these cells, having an ARFCN of 6 has been successfully decoded and in this case the BSIC is reported as 33. By accumulating the information from the two measurement cycles in this case we obtain the increased identification in the form of the BSIC for this cell. The benefits in terms of the location accuracy described above also accrue in this case.

Detailed Description of Measurement Accumulator

The present invention provides a method for accumulating radio parameter measurements from multiple measurement cycles. Typically such an implementation on a mobile terminal must operate within constrained resources, for instance the memory and CPU cycles available for operating the accumulator. The method described here provides the benefits of accumulation along with a framework in which the value of the information held in the table, from the viewpoint of a location solution can be optimised for a given set of resource constraint.

The accumulator maintains one table holding the identities of cells that are measured and one table holding the measurements pertaining to those cells. Each time a new measurement cycle is completed, these tables are updated. If a measurement pertaining to a new cell is received, the cell table is updated with the new cell identifiers. Since the size of the tables is limited (subject to memory and CPU cycle limits) it may be necessary to purge an existing entry from this table before adding the new cell. This purging of the tables is performed on a relative value basis, taking into account the relative value of the existing measurements associated with each of the cells in terms of a location calculation. The value of a cell in the cell table is calculated as the sum of the values of the individual entries in the measurement table which are associated with that cell. The value of individual measurements are calculated, taking into account the relative age, the type of measurement, the confidence associated with the match to the corresponding cell table entry and also the presence of any more recent similar measurements.

The least valuable cell is purged in order to optimise the value of the accumulated information at any given time. The measurement details are added to the measurement table, again after purging the least valuable existing measurement as required.

The following paragraphs illustrate the operation of the accumulator over two measurement cycles, after initialisation when using the SIM toolkit facility in a standard GSM handset. At initialisation the tables are empty. Table 3 shows the first measurement set obtained from the mobile terminal.

TABLE 3

NMR measurement at cycle 1

Serving cell

| cid = 26272 | rxLev = −80 |
|---|---|

Neighbour cells

| arfcn | bsic | rxLev |
|---|---|---|
| 12 | 17 | −88 |
| 26 | 35 | −90 |
| 28 | 23 | −90 |
| 40 | 19 | −97 |
| 22 | 39 | −99 |
| 30 | 5 | −103 |

Table 4 shows the state of the accumulator tables after adding the measurement set. The cell identifiers are added in the cell table. In the case of the serving cell measurement only the CID is added because the ARFCN and BSIC are not reported by the terminal. Conversely, for neighbour cells, the CID is not reported and therefore remains unspecified in the table. It should be noted that in other embodiments of the present invention, serving cell measurements may include the ARFCN and BSIC while neighbour measurements may include an unambiguous reference to the corresponding cell. The signal level values are added to the measurement table with a cross reference (shown in the cell Ind column) to the associated entry in the cell table. The age of each measurement is also recorded in the measurement table in the time column.

TABLE 4

Cell Table - Cycle: 1

| index | cellId | arfcn | bsic |
|---|---|---|---|
| 0 | 26272 | xxx | xx |
| 0 | xxxxx | 012 | 17 |
| 1 | xxxxx | 026 | 35 |
| 2 | xxxxx | 028 | 23 |
| 3 | xxxxx | 040 | 19 |
| 4 | xxxxx | 022 | 39 |
| 5 | xxxxx | 030 | 05 |

Measurement Table - Cycle: 1

| cellInd | time | match | rxLev | ta |
|---|---|---|---|---|
| 000 | 000 | 03 | −80 | −1 |
| 000 | 000 | 02 | −88 | −1 |
| 001 | 000 | 02 | −90 | −1 |
| 002 | 000 | 02 | −90 | −1 |
| 003 | 000 | 02 | −97 | −1 |
| 004 | 000 | 02 | −99 | −1 |
| 005 | 000 | 02 | −103 | −1 |

Table 5 shows the second measurement set obtained from the mobile terminal.

TABLE 5

NMR measurement at cycle 2

Serving cell

| cid = 26272 | rxLev = −83 |
|---|---|

Neighbour cells

| arfcn | bsic | rxLev |
|---|---|---|
| 12 | 17 | −88 |
| 26 | 35 | −90 |
| 28 | 23 | −90 |
| 18 | 4 | −97 |
| 40 | xx | −97 |

Table 6 shows the state of the accumulator tables after adding the second measurement set. In this case the cell table has grown by one due to the different neighbour cell reported in the second cycle (ARFCN 18 and BSIC 4). The measurement table has grown with the addition of all the measurements from the second cycle.

TABLE 6

Cell Table - Cycle: 2

| index | cellId | arfcn | bsic |
|---|---|---|---|
| 0 | 26272 | xxx | xx |
| 0 | xxxxx | 012 | 17 |
| 1 | xxxxx | 026 | 35 |
| 2 | xxxxx | 028 | 23 |
| 3 | xxxxx | 040 | 19 |
| 4 | xxxxx | 022 | 39 |
| 5 | xxxxx | 030 | 05 |
| 6 | xxxxx | 018 | 04 |

Measurement Table - Cycle: 2

| cellInd | time | match | rxLev | ta |
|---|---|---|---|---|
| 000 | 005 | 03 | −80 | −1 |
| 000 | 005 | 02 | −88 | −1 |
| 001 | 005 | 02 | −90 | −1 |
| 002 | 005 | 02 | −90 | −1 |
| 003 | 005 | 02 | −97 | −1 |
| 004 | 005 | 02 | −99 | −1 |
| 005 | 005 | 02 | −103 | −1 |
| 000 | 000 | 03 | −83 | −1 |
| 000 | 000 | 02 | −88 | −1 |
| 001 | 000 | 02 | −90 | −1 |
| 002 | 000 | 02 | −90 | −1 |
| 006 | 000 | 02 | −97 | −1 |
| 003 | 000 | 01 | −97 | −1 |

While the preceding example illustrates a particular form of the present invention in which GSM cell ID, signal level and round trip timings are represented in a measurement accumulator this should not be interpreted as a limitation of the invention. It will be clear to one of ordinary skill in the art how other types of measurements such as CDMA (IS95) pilot levels and PN offsets might be accumulated in similar fashion.

Selection and Reporting

When the information maintained at the mobile terminal is needed for a location calculation, the table contents can be encoded into a message for transmission. A further aspect of the present invention is the scheme for selecting the optimal set of information to encode. Typically there is a fixed limit on the length of the data that can be transmitted. This might for instance be the capacity of an SMS after other application header or addressing information has been encoded. The present method, scans the table and iteratively adds information in decreasing order of their relative value in calculating a location solution. Accordingly the first measurement relating to each unique cell represented in the cell table is added. Subsequently the $2^{nd}$ measurement relating to each cell is added and so forth until no more data can be fitted into the message. This reflects the value ordering since a single measurement pertaining to a new cell is as a general rule likely to be more useful from a location accuracy perspective than a repeat measurement for an existing cell.

An advantage of this aspect is that for a given transmission mechanism, the optimal subset of the information held by the mobile is sent. Additionally, this flexibility in encoding the information means that the amount of data transmitted can be adjusted based on the requirements of the application. In one instance where a lesser level of accuracy will suffice, a single message containing only those measurements that can be accommodated within a single message might be encoded and sent. A lesser accuracy requirement might be associated with a service charged at a lower rate, used for instance with an application to lookup point of interest in the vicinity of a mobile subscriber. In other applications, the best possible accuracy may be required, for instance with a high value asset tracking service. In such cases, more information, up to the entire contents of the tables can be sent. Depending on the bearer used to transmit the information, the proportion of information transmitted may be determined to a large extent by the maximum message size supported by the bearer.

In cases where the size of a single message is limited to a maximum value, (for instance SMS), the proportion of the information sent when lesser accuracy is required may be determined by the space available in a single message after application headers etc. Continuing with the example of SMS, if a higher accuracy s required, multiple concatenated SMSs might be used to transmit all of the available information. Taking another example, if GPRS is used, the number and or size of messages may be varied more finely. In one case, the most recent set of measurements may be sent. In another case, the most recent measurement pertaining to each unique cell in the cell table might be sent, in this way providing the maximum number of distinct geographical reference points in the solution. Another alternative is to send the most recent measurement of each measurement type pertaining to each cell in the table.

The value ordering may differ from that described above if different types of measurements are present in the table. In the previous case, all the measurements represented signal levels. However if some timing advance measurements were also present in the table, a timing advance measurement might be prioritised over a signal level measurement. Other types of measurements may also be maintained in the table. The corresponding full or partial cell identifiers are maintained in the cell table while the measurements are recorded in the measurement table When reporting the measurements, the mobile also indicates whether it has sent all of the available measurements. Should Quality of Service needs require more measurements, the network can request the remaining measurements from the mobile.

Advantage Compared to Averaging

Another benefit of accumulating successive measurement sets rather than averaging parameter measurements from a later cycle with previous parameter measurements arises because of the ambiguity in some parameter measurements. If using averaging, a repeated measurement of the signal level or timing for a given cell would be combined with the existing measurement by averaging rather than being preserved in the table as a separate entity. However in cases where a cell is only partially identified in a measurement cycle, there is a risk that the new measurement may actually be associated with a different cell having the same partial identify. Therefore the measurement in the second cycle is of a different parameter and it is an error to average it with the first measurement. The present invention addresses this by maintaining a separate table of cells and measurements as illustrated. For each entry in the measurement table, a tag is also added representing the degree of certainty in the association or match with the corresponding cell table entry. This can be observed from table 6. Serving cell measurements for which the full CID is reported are marked with a 3 in the match type column. Neighbour measurements, for which the potentially ambiguous ARFCN and BSIC are reported, are marked with a 2 representing a lesser degree of certainty in the association. Finally neighbour measurements for which only the ARFCN was reported (see for instance the last measurement in table 6) are marked with a match type of 1. In this way the risk of incorrectly associating ambiguous measurements with the wrong cell and the likely resulting error in location calculation can be mitigated, improving the overall accuracy of location estimates.

Location Engine Handling Ambiguous Measurements

While the preceding paragraphs described a method for avoiding the risk of an incorrect association between an ambiguous measurement and a cell, in many cases, ultimately to incorporate the measurement into a location calculation, the ambiguity may need to be resolved and thereby each measurement associated with a specific cell. The present invention reduces the risk of incorrect association and the attendant location errors by deferring the association step until the latest possible time. Indeed no explicit association takes place in the measurement accumulator. When the measurements are to be processed to derive a location estimate, the measurements having the least ambiguity, such as those which have unique cell identifiers, are processed first to derive an initial approximate location estimate. This estimate is then used in an ambiguity resolution step in which the remaining measurements are associated with their corresponding cells. The resolution process proceeds in order of increasing ambiguity. In the case of two measurements having the same type of ambiguity, the resolution proceeds in order of ambiguity in the sense that the measurement with the lowest number of candidate cell matches is resolved first. The estimated location is updated at each step, incorporating the newly resolved measurement.

To illustrate the operation of this aspect, consider the measurement table contents from table 6 reproduced in table 7 below.

TABLE 7

| cellInd | time | match | rxLev | ta |
|---------|------|-------|-------|-----|
| 000 | 005 | 03 | −80 | −1 |
| 000 | 005 | 02 | −88 | −1 |
| 001 | 005 | 02 | −90 | −1 |
| 002 | 005 | 02 | −90 | −1 |
| 003 | 005 | 02 | −97 | −1 |
| 004 | 005 | 02 | −99 | −1 |
| 005 | 005 | 02 | −103 | −1 |
| 000 | 000 | 03 | −83 | −1 |
| 000 | 000 | 02 | −88 | −1 |
| 001 | 000 | 02 | −90 | −1 |
| 002 | 000 | 02 | −90 | −1 |
| 006 | 000 | 02 | −97 | −1 |
| 003 | 000 | 01 | −97 | −1 |

Figure 2:
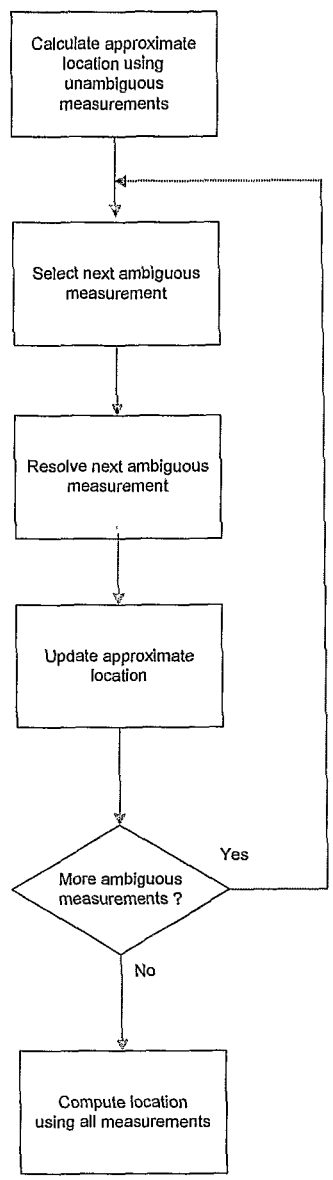
FIG. 2—is a process flow diagram of the processing to resolve ambiguities in two measurements.
Figure 3:
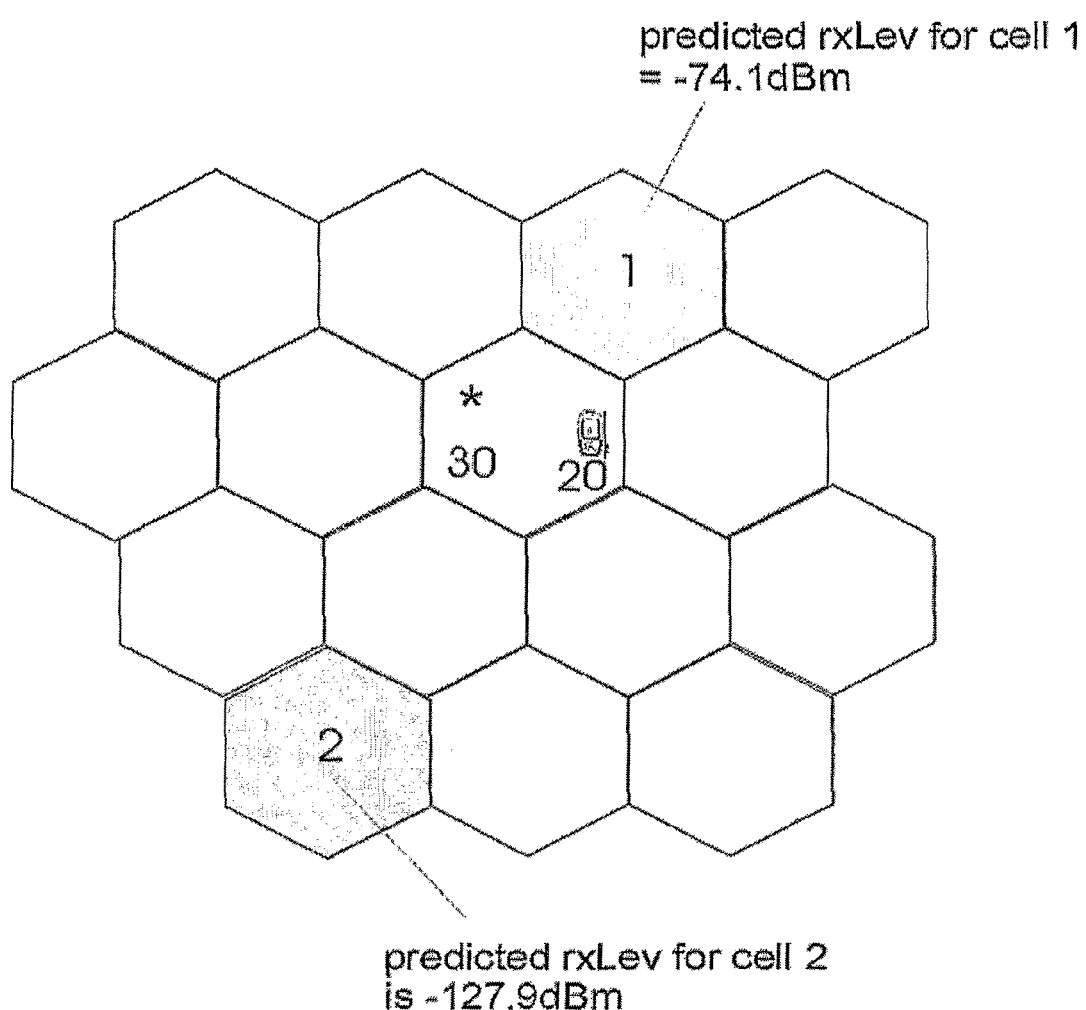
FIG. 3—shows an arrangement in a network in accordance with one aspect of the present invention.

In the first step, the measurements having a match type of 3 (i.e. having been specifically associated with a cell identifier) are processed to obtain a location estimate. After this the measurements having a match type of 2 (having been reported with partially ambiguous ARFCN and BSIC) are processed to resolve the ambiguity and associate each with a specific cell. Finally the single measurement having a match type of 1 (only the associated ARFCN is known) is added. This resolution process is illustrated in FIG. 2. The processing to resolve the ambiguity associated with a single measurement is illustrated in FIG. 3. An idealised mobile network is shown. Two specific cells 1 & 2 are labelled, in this example representing cells having the same ARFCN and BSIC. A mobile terminal 20, reports radio parameter measurements to enable a location calculation, including a signal level measurement for cell 1. The location engine identifies the signal level measurement pertaining to cell 1 as ambiguous since only the ARFCN and BSIC were reported and there are two cells in the network database having that ARFCN and BSIC. The resolution uses an approximate estimate for the mobile 30, derived from the measurements which are not ambiguous. This approximate estimate might correspond to the location of a cell identified in a serving cell measurement for instance. Other estimates might be used such as the centroid of a serving cell. If multiple unambiguous measurements are available, various combinations of these measurements might be used to obtain the initial estimate. Using this approximate estimate, a radio network model as described below is used to predict the received signal levels at the estimated location from the ambiguous cell candidates. In the illustration shown, the predicted level for cell 1 is −74.1 dBm, while the predicted level for cell 2 is −127.9. The one that is the most likely to have been received by the mobile terminal is selected as the cell that was actually measured, thereby resolving the ambiguity. The selection is typically the cell with the largest predicted received power at the approximate location estimate, in this case cell 1.

Location Engine Algorithm

The radio parameter measurements used to calculate location may include one or more signal levels, timing advances, time differences, or other parameters. In the present context we refer to these measurements as observations. As disclosed in PCT/AU2006/000347, the entire contents of which is hereby incorporated by reference, additional observations may be deduced from a lack of any measurements being reported for particular cells. These cells are referred to as unreported cells. This is on the basis that at any time, signal parameter measurements are obtained relating to only a subset of all the cells in the network. Further, in some networks such as GSM, the mobile only reports a subset of the cells that it can actually measure. For simplicity of explication, we will only deal here with three types of observations: signal levels, round trip timing measurements and unreported cells. The algorithm described here is readily extended to other types of observations such as time differences as would be understood by one skilled in the art.

We make the following definitions:

The $i^{th}$ signal strength observation is denoted by a vector, $o_{r_i}$ where $$o_{r_i} = [k_{r_i}, r_i]^T$$

with $k_{r_i}$=the identifier of the $i^{th}$ signal strength observation, and $r_i$=the signal level (dBm) of the $i^{th}$ signal strength observation.

For a given hypothesized location of the mobile terminal, a cost is calculated based on the observations and corresponding predicted values for the observed parameters. The predicted values are obtained using a mobile radio network propagation model as well known in the art. The model uses information on the configuration of the radio network including the location of cell sites, the height and orientation of cell antennas, the radiation pattern of the antennas as well as the channel frequencies and any other codes allocated to each cell. The model also covers the loss in signal power as radio signals travel from transmitter to receiver. Such models are well known in the radio communications field and can be found in most advanced level texts on the subject. Predicted received signal powers can be generated for any or all cells in the network. These power levels can also be used to derive interference level estimates so that the received quality of a signal from any particular cell can be predicted. The application of network model for predicting received signal levels and interference levels is well known to those skilled in the art of cellular radio network design. Detailed references exist in the literature including, W. C. Y. Lee, *Mobile Communications Engineering*. McGraw-Hill, 1982, and P. L. H. A. S. Fischer, *Evaluation of positioning measurement systems*," T1P1.5/97-110, December 1997, and IEEE VTS committee, *Coverage prediction for mobile radio systems operating in the 800/900 MHz frequency range*, IEEE Transactions on VTC, Vol 37, No 1, February 1998. The entire contents of these references are hereby incorporated by reference.

The cost is a quantitative representation of the difference between the measurements and the corresponding predictions. In some contexts such a cost function may also be known as a penalty function as is well known to those skilled in the art of numerical optimization.

The cost associated with the signal strength observations is, $C_r$, which is given by $$C_r(x) = \sum_{i=1}^{N_r} \frac{(r_i - p_r(k_{r_i}, x))^2}{2\sigma_r^2}$$

where $N_r$=the number of signal strength observations, x=the hypothesised location of the mobile.

$p_r(j,x)$=the predicted received signal level of the $j^{th}$ cell at location x $\sigma_r$=the standard deviation of the signal strength measurements.

The $i^{th}$ timing advance observation is denoted by a vector, $o_{t_i}$ where $$o_{t_i} = [k_{t_i}, t_i]^T$$

with
$k_{t_i}$=the identifier of the $i^{th}$ timing advance observation, and
$t_i$=the $i^{th}$ timing advance observation.

The cost associated with the timing advance observations is, $C_t$, is given by $$C_t(x) = \sum_{i=1}^{N_r} \frac{(t_i - p_t(k_{t_i}, x))^2}{2\sigma_t^2}$$

where
$N_t$=the number of timing advance observations, and
$p_t(j,x)$=the predicted timing advance of the $j^{th}$ cell at location x
$\sigma_t$=the standard deviation of the timing advance measurements.

The $i^{th}$ unreported cell observation is denoted by a scalar, $o_{u_i}$, where $$o_{u_i} = k_{u_i}$$

and
$k_{u_i}$=the identifier of the $i^{th}$ unreported cell.

The cost associated with unreported cell observations is $C_u$, which is given by $$C_u(x) = -\sum_{i=1}^{N_u} \log\left[\frac{1}{2}\left(1 + \text{erf}\left(\frac{r_u - p_u(k_{u_i}, x)}{\sqrt{2}\,\sigma_r}\right)\right)\right]$$

where
$N_u$ is the number of unreported cells,
$p_u(j,x)$=the predicted signal level (dBm) of the $j^{th}$ cell at location x
$\sigma_r$=the standard deviation of the signal strength measurements.
$r_u$=a fixed threshold (in dBm), as described in PCT . . . , Note that we describe in a subsequent paragraph a means for identifying the relevant unreported cells.

The total cost function, C, is given by $$C(x) = C_r(x) + C_t(X) + C_u(x)$$

The location algorithm seeks to find the location x, that minimises this cost function. Robust numerical methods for minimising such a cost function are well known in the art, and can be found in texts on the subject such as, W. H. Press, S. A. Teukolsky, W. T. Vetterling & B. P. Flannery, *"Numerical Recipes in C++; The Art of Scientific Computing"*, 2nd Ed, February 2002, Cambridge University Press.

Identifying Suitable Unreported Cells

The set of unreported cells for a given location calculation potentially includes all cells not associated with any of the measurements to be used for the location calculation. The principle behind the use of the unreported cells is that the lack of a report for a cell can be used to obtain another positional constraint on the location of the mobile terminal making the measurements. Therefore the cells that are of interest for use as unreported cells are those for which the lack of a report conveys some information. It can easily be understood that a cell at a great distance from the approximate location of the mobile conveys no information. Put simply it comes as no surprise that the cell is not reported. It is for cells that are close to the mobile that the lack of a report conveys useful information.

Figure 4:
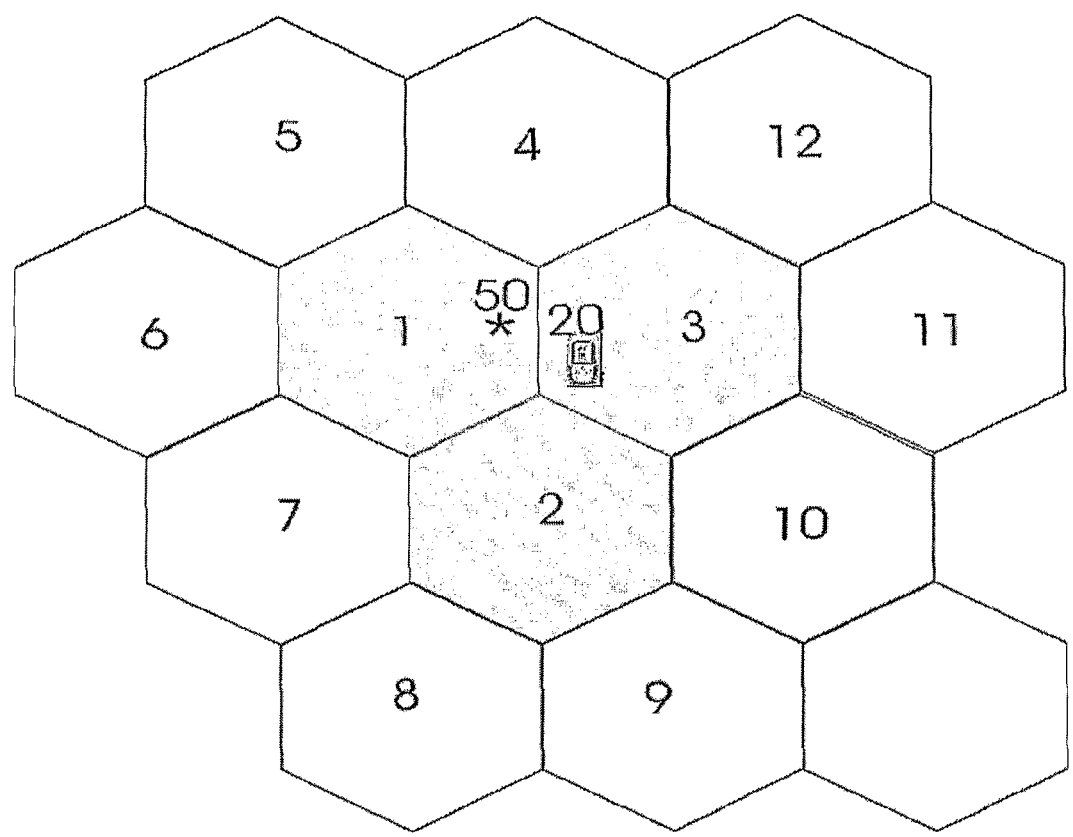
FIG. 4—shows an arrangement in a network in accordance with another aspect of the present invention.

FIG. 4 provides a supporting illustration. It shows a mobile network with a cluster of cells represented in the idealised hexagonal form. A mobile terminal 20 is also shown. The mobile terminal makes a set of radio parameter measurements using signals transmitted from the three cells numbered 1, 2 & 3. These have been highlighted with the heavy shading in the figure. Based on these measurements an initial estimate 50 for the location of the mobile is calculated. This is shown with an asterisk. In order to identify the candidate unreported cells we select from all the remaining unreported cells, the ones which it is likely could have been measured and reported by the mobile terminal at the estimated location. A propagation model is used to predict the signal levels that would be received by a mobile at the estimated location. A selection criteria is then applied. This criteria may be either based on the predicted received signal level or alternatively a predicted C/I. In GSM for instance a suitable C/I threshold would be +9 dB. For a UMTS network, a suitable threshold might be a CPICH Ec/I0 level of −20 dB. Other threshold values depending on the network and application may range from about −26 dB to about +15 dB, (for example, −26 dB to −12 dB, −22 dB to −6 dB, −20 dB to −12 dB, −15 dB to 0 dB, −12 dB to +3 dB, −6 dB to +12 dB, −3 dB to +15 dB and +3 dB to +15 dB etc.).

Any cells for which the predicted C/I exceed this threshold would be included in the unreported set. In the limit, all remaining cells in the network could be added to the unreported set, the only penalty in this case is the waste of computing resource in evaluating the unreported cost for these cells, most of which would contribute negligibly to the solution.

Typical Performance

In the following paragraphs we outline typical results achieved in a variety of environments in a GSM network using a standard GSM mobile terminal. Table 8 shows accuracy statistics computed for measurements taken at 135 points in a dense urban environment. The reported statistics are the radial location error at the $67^{th}$ percentile and the $95^{th}$ percentile if all points are ordered according to increasing radial error. This is common practice for reporting location accuracy in the field of mobile terminal location. Results are shown for three different location estimation methods. The last row in the table indicates the results for one embodiment of the present invention. The first two rows show the results for alternative methods of location estimation that are well known in the art and serve as a reference measure illustrating the degree of improvement offered by the present invention.

TABLE 8

| Method | 67% | 95% |
| --- | --- | --- |
| Cell ID | 102.4 | 264.3 |
| Cell ID + TA | 138.5 | 505.9 |
| Present invention | 73.5 | 206.4 |

Table 9 shows the results of measurements at 150 points in a suburban environment. As will be understood by one of ordinary skill in the art, the greater cell site spacing in suburban environments accounts in large part for the decreased accuracy compared to the urban measurements.

TABLE 9

| Method | 67% | 95% |
| --- | --- | --- |
| Cell ID | 1181.8 | 3137.2 |
| Cell ID + TA | 812.3 | 2205.9 |
| Present invention | 442.8 | 805.9 |

Table 10 shows the results of measurements at 115 points in a rural environment.

TABLE 10

| Method | 67% | 95% |
| --- | --- | --- |
| Cell ID | 1623.2 | 3943.2 |
| Cell ID + TA | 1211.1 | 2694.1 |
| Present invention | 493.8 | 1271.8 |

Time Diversity of Measurement Sets

An issue arises when using measurements made over a period of time rather than at the same instant for a mobile terminal location calculation. The issue is that the terminal may be in motion and successive measurement sets may not have been made at the same location. If the movement between measurement sets is sufficiently large, for example greater than about 25 meters (eg. >20 m, >35 m, >50 m. >100 m etc.), combining the measurements in a single calculation will as a general principle result in larger errors than if the individual measurement sets were processed individually.

The present invention provides an adaptive location calculation method for use when measurements recorded at more than one instance are reported for use in the calculation. The first step is to use the first measurement set to derive a profile representing the location at which the measurements were made. The sets to which individual measurement belong is represented by the elapsed time column in the measurement table. The subsequent measurement sets are then compared against this profile as disclosed in the co-pending application [home zone] to check whether they are likely to have been made in the same vicinity as the initial set of measurements. The threshold for the comparison is set so as to have a relatively small zone of the order of a few tens of meters.

If the comparison indicates that the measurements are made at the same location, the measurements are combined in a single calculation using the method described in this specification. Alternatively if the respective measurements appear to be made by a moving terminal, separate location calculations are performed using the respective measurement sets. The results of these are then averaged if a single location estimate is required. Alternatively the measurements may be used to estimate a vector representing the direction of motion as will be understood by one skilled in the art Adaptively Gaining More Data It is well known in the art that the number of measurements and the relative geometry between the mobile and the transmitters affects the accuracy of the location estimate. The Dilution of Precision referred to earlier in this invention is one metric used to quantify this effect. The mechanism for combining the number and relative geometry of measurements to provide an estimate of the accuracy of a position estimate is also well known in the art. As discussed earlier, the mobile may not make or may not report all of the measurements that could be useful in making a more accurate location estimate. Using the Dilution of Precision or similar metric, the location computation can identify and subsequently request from the mobile which further measurements would provide the most improvement to the location estimate. These may be measurements of base stations not yet reported by the mobile and/or further measurements of base stations already reported.

Either prior to computing a location estimate or afterwards, the location accuracy can be estimated using methods known in the art for instance as disclosed in C. R. Drane, Positioning Systems—A Unified Approach, Lecture Notes in Control and Information Sciences, Springer Verlag, October 1992. If the estimated accuracy does not meet or exceed a predefined accuracy, then further measurements can be requested from the mobile. The predefined accuracy can be a global requirement or a Quality of Service parameter associated with each location request. To avoid an endless cycle of requests for additional information in situations where the mobile is not able to make measurements of sufficient quantity or quality, a second parameter can be specified to limit the number of additional requests that are allowed.

Identifying a base station that would improve the accuracy of the location estimate uses the same approach as that to identify cells that were unreported but which may convey location information. Having identified those cells that could be heard based on the current position estimate, the effect each would have on the accuracy of the solution is evaluated. This provides a ranking to enable the mobile to attempt to measure the cell offering the greatest potential improvement in accuracy first given that the mobile has limited resources in terms of measurement opportunity, memory to store measurements and space in which to report measurements back to the network. Optionally the ranking may use a combined metric that includes the potential improvement and a measure of the likelihood that the cell could be measured as estimated during the initial identification process.

Adjusting Measurement Confidence

The quality of measurements made by a mobile phone vary with the type of radio environment and the type of measurement being made. In an urban environment, relatively higher levels of fast and slow fading and interference significantly degrade the quality of timing measurements. The same phenomena are also responsible for larger variations in signal strength measurements made in urban environments. By accounting for the effect the radio environment has on timing measurements and signal strength, the accuracy of position estimates can be improved.

The first step is to quantify the effect the radio environment has had on each of the measurements that will be used to obtain a location estimate. A common mechanism for quantifying such an effect is to modify the parameters of the statistical model being used describe the nature of measurement errors, often using a scaling parameter. For example in a Gaussian model, the standard deviation would be increased to reflect the larger uncertainty associated with measurements deriving from an urban environment. Each measurement in a set may be considered individually and assigned its own parameters. For a given location, it is most likely that all measurements are affected by the same environment and thus could all be assigned the same parameters.

A mechanism for assigning parameters is to classify the different radio environments and for each environment type specify for that environment the error distribution and associated parameters. Table 11 illustrates such a classification mechanism. The values used in table 11 can be obtained from radio propagation models well known in the art, experimental data, radio propagation modelling tools, or a combination of one or more of these.

TABLE 11

| | Effect on Received Level | | Effect on Timings | |
|---|---|---|---|---|
| Environment | Standard Deviation (dB) | Distribution | Standard Deviation (m) | Distribution |
| Urban | 12 | Gaussian | 1500 | Gaussian |
| Suburban | 10 | Gaussian | 1000 | Gaussian |
| Rural | 8 | Gaussian | 500 | Gaussian |

Various mechanisms can be defined for assigning an environment type to a measurement. The environment type assigned to a measurement can be that assigned to the originating base station. The environment type of the serving cell can be assigned to all measurements in a given measurement set. The environment type could be spatially defined and the measurements assigned the environment type according to a coarse position measurement estimate.

Various mechanisms exist to define the environment type associated with a base station or a region of the network coverage area. Knowledge of the built environment can be used to assign environment types. The density of cells is highest in urban areas and lowest in rural areas. Hence a metric based on the average distance to nearby cells can be used to assign an environment type to a base station or for a region. For example, cell radii can be estimated to be half the average distance to the nearest n cells or cell sites. The environment classification could be radii less than 1 km are defined urban, >=1 km and <4 km are Suburban and >=4 km are Rural.

Figure 5:
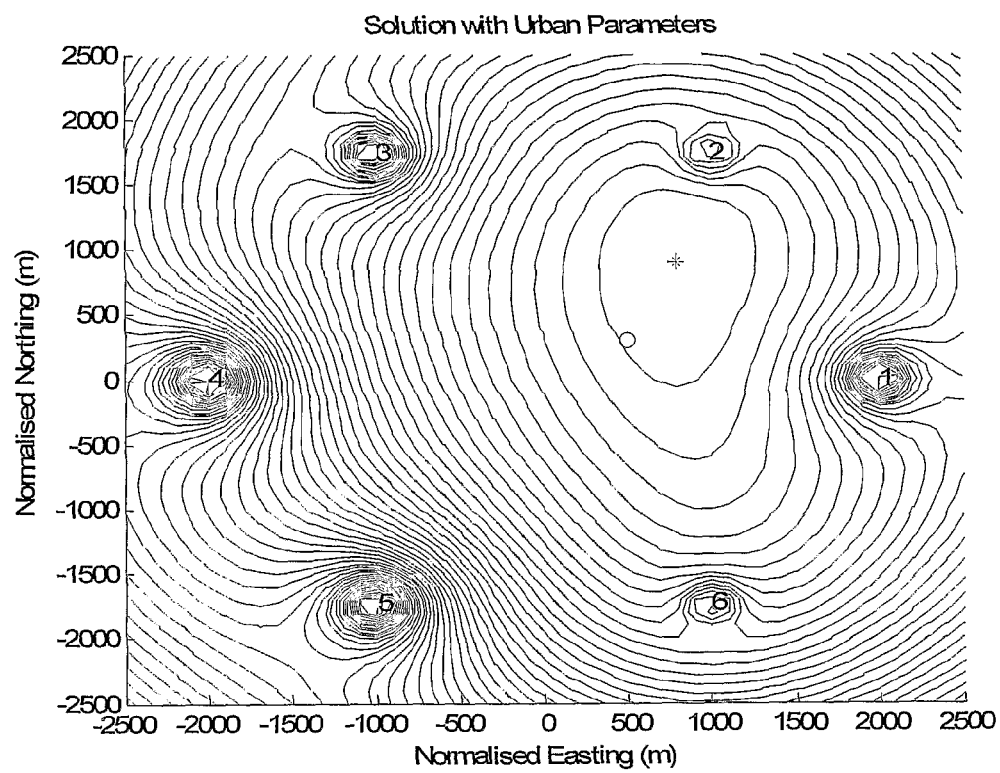
FIG. 5 illustrates a position estimate calculated using parameters for an urban environment.
Figure 6:
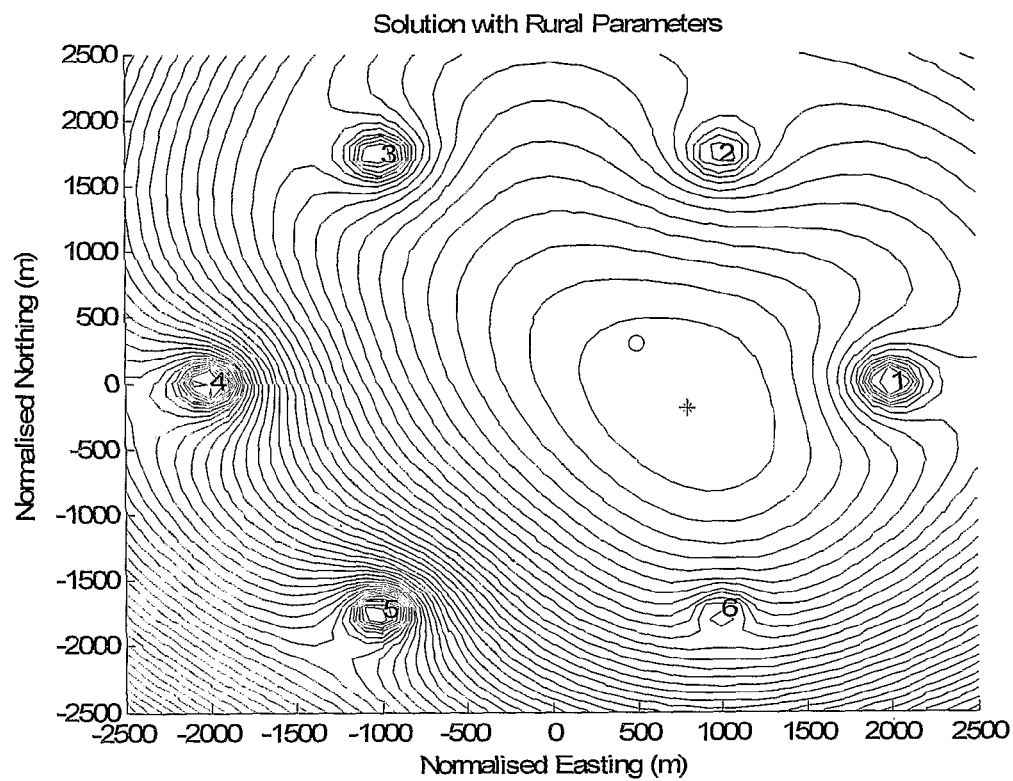
FIG. 6 illustrates a position estimate calculated using parameters for a rural environment.

To illustrate the effect the environment parameters have on the location solution, consider a radio network illustrated in FIGS. 5 and 6 in which a mobile at the location labelled "o" hears 6 base stations labelled 1-6. The received signal levels at "o" are −85.9 −66.6 −85.3 −98.8 −99.2 and −70.6 for base stations 1 to 6 respectively. A GSM Timing Advance measurement provides a range estimate of 2200 m with respect to transmitter No 2. A location estimate is made using urban cell and rural cell standard deviations from Table 8 (12 dB for received signal levels and 1500 m for range measurements for urban, 9 dB for received signal levels and 500 m for range measurements for rural. FIGS. 5 (rural) and 6 (urban) show contour plots of the respective cost functions along with the true location (marked "o") and estimated position where the cost was lowest (marked "*"). The error using urban parameters was 670.8 m and for rural parameters the error was 583.1 m, a difference of 100 m in accuracy due to the difference in the error models.

Detecting Change in Position at the Mobile Terminal

A co-pending International Patent Application entitled "Enhanced Terrestrial Mobile Location" and claiming priority from Australian Provisional Patent Application Nos. 2005901735, 2005903577 and 2005906105 (the entire contents of which is hereby incorporated by reference) discloses a method for obtaining a profile defining a zone based on radio parameter measurements in the zone. The entire contents of which are hereby incorporated by reference. An aspect of the present invention utilises this method to provide a means for reporting measurements to a network element only when the mobile terminal has moved from a starting position. One application of this facility is in tracking to avoid unnecessarily reporting measurements when the mobile has not moved. This has the advantaged of reducing the consumption of network resources and mobile terminal battery power.

The solution is at a starting time to use the most recent measurements to derive a temporary local profile of the expected measurements. The terminal then compares subsequent measurements with this temporary profile to check for a significant change in position. No further reports are sent until the checks indicate that a significant change in position has occurred. Techniques for comparing the measurements with the profile are discussed in the referenced application. As also disclosed in the referenced application, the extent of the temporary zone may be controlled to achieve smaller or larger thresholds for the change in position required before a new message is sent.

Cost Efficient Handset Based Tracking

The present invention also provides a handset based location tracking capability. On initialisation, the mobile terminal may request from the network an initial collection of data concerning the base stations in the network. This request is accompanied by the current filtered measurements to enable the server to determine the current location of the mobile and compile a suitable collection of data covering the vicinity of the mobile. The server then transmits to the mobile a collection of base station network data covering that area, including for each base station in the collection, identifiers and antenna details including characteristics, orientation and location. Compression may be applied to the data to maximise the region that can be covered with a fixed payload size. Additionally in the majority of cases only one full entry is sent per cell site because identifiers of different co-located sectors typically differ only in the least significant digit and the same location values may apply to all sectors. Using the data provided, the mobile terminal may compute a location estimate. This calculation may be repeated periodically or in response to user action such as a menu selection. In some applications, location estimates are computed repeatedly and filtered, to reduce the errors. In some applications a coarse velocity estimate may also be obtained. The mobile terminal also monitors the estimated location relative to the current collection of network data. If the estimated position approaches the geographical limits of the region covered by the current data, a request is sent to the server for additional data. As before, the request is accompanied by the current position and velocity if available, enabling the server to optimise the coverage of the network data provided. Existing collections of network data are retained in the mobile terminal, only being discarded when necessitated by memory constraints. The data are discarded based on farthest distance to the current estimated location. The mobile terminal may also perform consistency checks to detect cases where previously supplied network data become outdated due to a change in the network configuration. This may happen for instance when a base station frequency or ID is changed. For applications where the location of the mobile is required to be updated regularly at a fixed terminal, the mobile terminal may be configured to transmit reports of the current location. To support applications where the route or total distance traveled by the mobile is also of interest, the mobile terminal may also maintain a history of filtered location estimates. This information can be retrieved as required by the network based server. Compared to operating a tracking system using network based methods, the present invention provides an efficient tracking capability, with lower network and battery impact. It provides useful accuracy without the high transaction costs associated with location measurements in the network or hybrid location system.

In another embodiment of the present invention, the mobile receives the necessary details for all base stations in the network. Such an approach may be inefficient using radio-based resources but for devices such as PDAs which are regularly connected to the internet via a docking station the size of the data to be received is more easily accommodated. Whenever the PDA is docked, it may synchronise its copy of the network data required for the location calculations.

A cell ID based location estimate can be made on the handset provided the handset has the coordinates of the base stations it is currently hearing. In general the handset requires the base station identification information that enables the mobile to associate the signals it is measuring with the coordinates of the origin of that signal. In one embodiment the mobile may estimate its location as a weighted average of the coordinates of the cells that have been measured recently. The measurements could be considered equally important in which case the weighting applied to each cell would be one. Typically a serving cell is closer to the mobile than cells for which neighbour measurements are made. Accordingly in some cases the serving cell may be given a higher weighting than the other cells. For a specific example, consider a mobile in a GSM network. To perform a cell ID based location the mobile would need to know for each of the signals it can hear, the Cell ID, the base station identity code, the ARFCN, and the coordinates.

The vagaries of mobile radio propagation are such that a mobile can occasionally detect a signal from further away than would generally be expected for a given network configuration. Such cells can have a significant adverse impact on cell ID based location accuracy. To make the estimation process more robust to such effects, the set of cells to be used in the estimation process can be edited to create a trimmed estimate. This editing may occur before or after a location estimate has been obtained. More than one cycle of editing may be employed. Various criteria can be used for choosing which cell(s) as discussed below.

Consider a single-weighted average in a cell ID location estimate in which there are n cells. Each cell, in effect contributes one nth of the result. Consider the cell which is furthest away from the location estimate. Compute a new location estimate with this cell removed from the set of measurements. Compute the distance e between first estimate with the new location estimate. Compute the normalised metric e/nr where r is the average effective radius of the cells that are in the set. This metric is a normalised measure of how much the farthest cell has been able to alter the estimate. If this metric is too high, then the cell is deemed to have had a disproportionate effect on the location estimate and should edited from the set used to compute a solution. This process can be repeated until the furthest cell is not having undue control over the estimate. Other criteria include editing the furthest m cells or the furthest x percent of cells as measured from the location estimate.

A more accurate location estimate can be achieved using the cell centroid instead of base station coordinates. Computation of the cell centroid requires information on the directivity of the antenna, the pointing angle and the effective radius of the cell. The equations required to compute such a centroid are shown below. The effective cell radius may also be provided or alternatively estimated by the mobile based on the distance to nearby cells. In terms of minimising the computation in the mobile, the mobile may be simply provided with the cell centroid coordinates by the network instead of, or in addition to, the base station coordinates. To illustrate, consider an example in a network using sectorised cells. For a particular cell having an effective radius R, we calculate a range $$r = \frac{R}{\sqrt{2}}$$

If the cell site is located at $(x_b, y_b)$, the centroid will be given by $$x_c = x_b + r \cos \theta$$

$$y_c = y_c + r \sin \theta$$

where $\theta$=pointing angle of cell measured counter clockwise from east.

If $\phi$ is the angle measured clockwise from north, then $$\theta = -\varphi + \frac{\pi}{2}.$$

Figure 7:
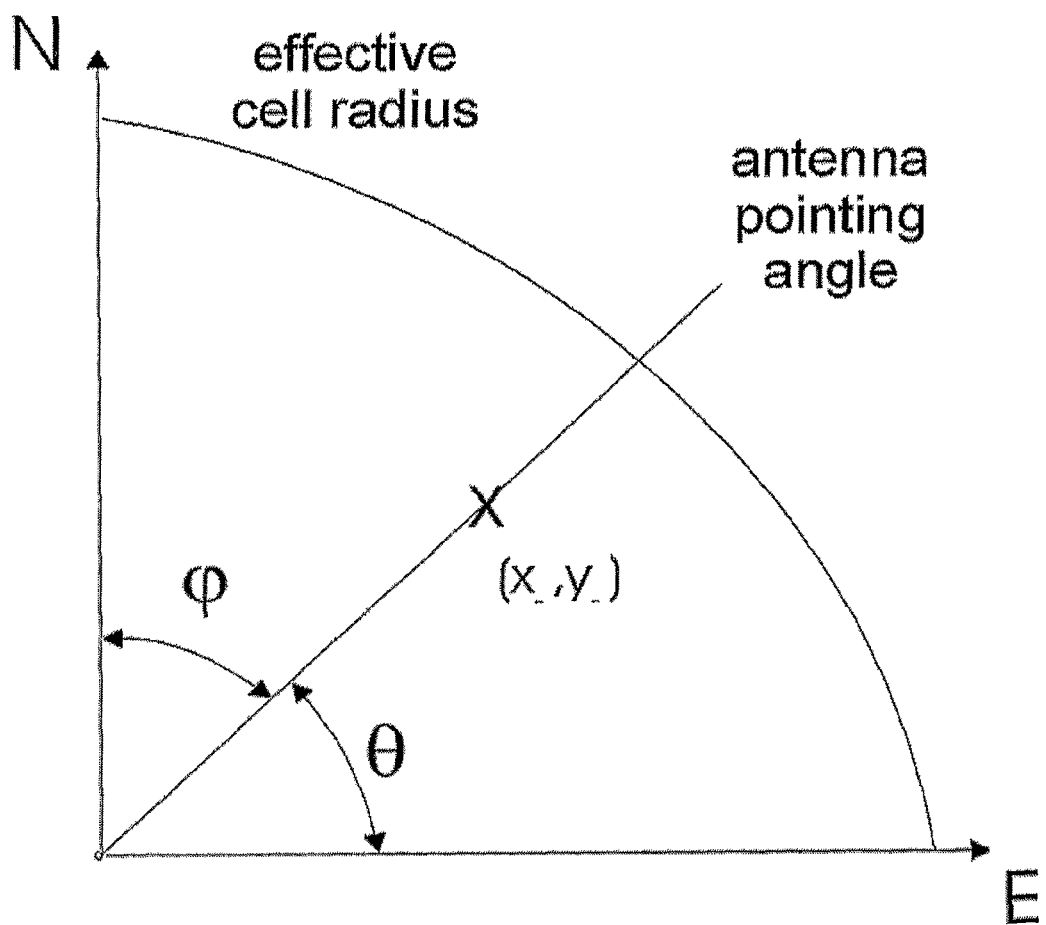
FIG. 7—illustrates the computation of a cell centroid.

FIG. 7 illustrates these calculations.

Where more than one cell is measured, the location estimate is the weighted average of the cell centroids for the cells currently being heard by the mobile. Suppose that the centroid of the $i^{th}$ cell is $(x_i, y_i)$, then the location estimate is calculated as, $$\hat{c} = \left( \frac{\sum_{i=1}^{N} w_i x_i}{\sum_{i=1}^{N} w_i}, \frac{\sum_{i=1}^{N} w_i y_i}{\sum_{i=1}^{N} w_i} \right)$$

where

N=the number of cell sites used in the calculation, and
$w_i$=the weighting applied to each cell.
Note that $w_i \geq 0$.
As an example, $w_i=1$, $\forall i$, equally weights each cell.

When round trip timing information is available in the handset, the handset can compute a location estimate that combines the timing measurement with the base station information. For example in GSM, the mobile can use the Timing Advance and the base station pointing angle to calculate a position estimate.

It will be understood that the term "comprise" and any of its derivatives (eg. comprises, comprising) as used in this specification is to be taken to be inclusive of features to which it refers, and is not meant to exclude the presence of any additional features unless otherwise stated or implied.

The claims defining the invention are as follows:

1. A method of obtaining a subset of radio signal parameters for transmission to a processor for use in a location calculation, the method comprising:
    obtaining a first set of radio signal parameter measurements at a first time in a first measurement cycle;
    storing the first set of radio parameter measurements and the first time in an accumulator;
    obtaining a second set of radio signal parameter measurements at a second time in a second measurement cycle, wherein the difference between the first time and the second time is based on a configurable rate;
    storing the second set of radio signal parameter measurements and the second time in the accumulator;
    calculating a value associated with each radio parameter measurement stored in the accumulator, wherein each value indicates the relative value for performing a location calculation, and wherein each value for a radio signal parameter measurement from the first or second measurement cycle is based on the relative age of the respective measurement;

selecting one or more radio signal parameter measurements stored in the accumulator based on the one or more associated values to obtain a subset of radio signal parameter measurements, wherein at least one radio signal parameter measurement from the first set and at least one radio signal parameter measurement from the second set are selected; and storing the subset of radio signal parameter measurements for subsequent transmission to a processor for use in the location calculation.

2. A method as claimed in claim 1 wherein the first set of radio signal parameter measurements and the second set of radio signal parameter measurements are obtained by a mobile radio communications terminal.

3. A method as claimed in claim 2 wherein further sets of measurements of radio signal parameters are obtained in subsequent measurement cycles, until a buffer of the mobile radio terminal is full.

4. A method according to claim 2 further comprising sending assistance information to the mobile radio terminal.

5. A method as claimed in claim 4 wherein a location estimation is calculated at the mobile radio terminal using the assistance information.

6. A method as claimed in claim 1 wherein the subset is transmitted to the processor intermittently.

7. A method as claimed in claim 1 wherein the subset is transmitted to the processor at regular time intervals.

8. A method as claimed in claim 7 wherein the subset is transmitted to the processor upon request of the processor.

9. A method as claimed in claim 7 wherein the subset is transmitted to the processor upon request of a user of the mobile radio terminal.

10. A method as claimed in claim 9 wherein the subset is transmitted upon a change in location of the mobile radio terminal.

11. A method as claimed in claim 1 wherein the subset is transmitted to the processor upon request.

12. A method according to claim 1 wherein selecting at least one radio signal parameter measurement stored in the accumulator is based on minimizing an amount of radio signal parameter measurements to be transmitted to the processor for a specific application having a lesser accuracy requirement.

13. A method according to claim 1 further comprising storing a plurality of subsets.

14. A method according to claim 1 wherein selecting at least one radio signal parameter measurement stored in the accumulator is based on maximizing a diversity of information in the subset for a specific application having a higher accuracy requirement.

15. A method according to claim 1 wherein the subset is transmitted in a variable length data message.

16. A method as claimed in claim 15 wherein the length of the data message is determined according to a specific application.

17. A method as claimed in claim 1 further comprising periodically removing from the accumulator at least one stored radio signal parameter measurement.

18. A method as claimed in claim 17 wherein the step of periodically removing from the accumulator the at least one stored radio signal parameter measurement is done according to relevance.

19. A method as claimed in claim 1 wherein selecting the one or more radio signal parameter measurements stored in the accumulator is according to a relevance of each radio signal parameter to performing the location calculation.

20. A method as claimed in claim 1 wherein selecting the one or more radio signal parameter measurements stored in the accumulator is according to a size of the subset.

21. A method as claimed in claim 1 wherein the first set or the second set of radio signal parameter measurements include at least one unambiguous radio signal parameter and at least one ambiguous radio signal parameter.

22. A method according to claim 21 wherein the ambiguous radio signal parameter is resolved before selecting one or more radio signal parameter measurements stored in the accumulator.

23. A method according to claim 22 wherein the step of resolving the ambiguous radio signal parameter is deferred for as long as possible prior to selecting one or more radio signal parameter measurements stored in the accumulator.

24. A system for performing the steps of claim 1.

25. A mobile radio terminal for performing the steps of claim 1.

26. A method for calculating a location of a mobile radio terminal in a radio communications network the method comprising:

receiving a subset of radio signal parameter measurements obtained at a mobile radio terminal, the radio signal parameter measurements comprising respective indications of ambiguity, the subset including at least a first particular radio signal measurement corresponding to a first indication of ambiguity and a second particular radio signal measurement corresponding to a second indication of ambiguity, the second indication of ambiguity being indicative of a greater level of ambiguity than the first indication of ambiguity;

processing with a processor the subset to calculate a first estimated location of the mobile radio terminal based on a first particular radio signal parameter measurement corresponding to a first indication of ambiguity;

resolving an ambiguity of the second particular radio signal parameter measurement corresponding to the second indication of ambiguity based on the first estimated location; and processing with the processor the subset to calculate a second estimated location of the mobile radio terminal based on the first particular radio signal parameter measurement and the second particular radio signal parameter measurement.

27. A method as claimed in claim 26 wherein the step of processing comprises minimising a cost function.

28. A method as claimed in claim 27 wherein the cost function is given by:

$$C(x)=C_r(x)+C_t(x)+C_u(x)$$

where:

$C_r$ is the cost associated with signal strength observations;

$C_t$ is the cost associated with timing advance observations; and $C_u$ is the cost associated with unreported cell observations.

29. A method as claimed in claim 28 wherein $C_r$, $C_t$ and $C_u$ are calculated as follows:

$$C_r(x) = \sum_{i=1}^{N_r} \frac{(r_i - p_r(k_{ri}, x))^2}{2\sigma_r^2}$$

$$C_t(x) = \sum_{i=1}^{N_r} \frac{(t_i - p_t(k_{ti}, x))^2}{2\sigma_t^2}; \text{ and}$$

$$C_u(x) = -\sum_{i=1}^{N_u} \log\left[\frac{1}{2}\left(1 + \text{erf}\left(\frac{r_u - p_u(k_{ui}, x)}{\sqrt{2}\,\sigma^2}\right)\right)\right].$$

30. A method of obtaining a subset of radio signal parameters for transmission to a processor for use in a location calculation, the method comprising:
  obtaining a first set of radio signal parameter measurements at a first time in a first measurement cycle;
  storing the first set of radio parameter measurements and the first time in an accumulator;
  obtaining a second set of radio signal parameter measurements at a second time in a second measurement cycle;
  storing the second set of radio signal parameter measurements and the second time in the accumulator;
  assigning a plurality of representations of ambiguity to the radio parameter measurements stored in the accumulator;
  calculating a value associated with each radio parameter measurement stored in the accumulator, wherein each value is relative to performing a location calculation, and wherein each value for a radio signal parameter measurement from the first or second measurement cycle is based in part on the first or second time;
  selecting one or more radio signal parameter measurements stored in the accumulator based on the one or more associated values to obtain a subset of radio signal parameter measurements, wherein at least one radio signal parameter measurement from the first set and at least one radio signal parameter measurement from the second set are selected; and
  storing the subset of radio signal parameter measurements;
  transmitting the subset to a processor for use in the location calculation, wherein the processor is configured to estimate a location based on at least a first measurement corresponding to a first representation of ambiguity and resolving an ambiguity of at least a second measurement corresponding to a second representation of ambiguity more ambiguous than the first representation of ambiguity based on the estimated location and to update the estimated location based on the at least the second measurement as resolved.

* * * * *